United States Patent [19]
Martinez

[11] Patent Number: 4,750,131
[45] Date of Patent: Jun. 7, 1988

[54] METHOD OF DETECTING FAULTY PARTS IN A PROGRESSIVE DIE PRESS

[75] Inventor: Miguel R. Martinez, East Windsor, N.J.

[73] Assignee: RCA Licensing Corporation, Princeton, N.J.

[21] Appl. No.: 775,027

[22] Filed: Sep. 11, 1985

[51] Int. Cl.[4] .................. G06F 15/46; G06F 15/36
[52] U.S. Cl. .................. 364/476; 364/506; 364/552; 73/862.53
[58] Field of Search .............. 364/472, 473, 474, 475, 364/476, 550, 551, 552, 506, 571, 507; 72/3, 7, 21, 26; 73/862.51, 862.53, 862.54

[56] References Cited

U.S. PATENT DOCUMENTS

| | | | |
|---|---|---|---|
| 3,257,652 | 6/1966 | Foster | 364/552 |
| 3,930,248 | 12/1975 | Keller | 340/267 R |
| 4,057,713 | 11/1977 | Mette et al. | 364/476 |
| 4,088,899 | 5/1978 | Miller et al. | 307/116 |
| 4,121,449 | 10/1978 | Celi | 72/350 |
| 4,125,009 | 11/1978 | Byrd et al. | 72/350 |
| 4,320,463 | 3/1982 | Himmelstein | 364/552 |
| 4,408,471 | 10/1983 | Gossard et al. | 72/21 |
| 4,470,287 | 9/1984 | Antonov | 72/347 |
| 4,481,589 | 11/1984 | McGowan et al. | 364/474 |
| 4,504,920 | 3/1985 | Mickowski | 364/550 |
| 4,532,793 | 8/1985 | Bezold | 72/342 |
| 4,536,849 | 8/1985 | Borisch et al. | 364/550 |
| 4,548,066 | 10/1985 | Martinez et al. | 73/1 J |
| 4,592,220 | 6/1986 | Martinez et al. | 72/16 |

*Primary Examiner*—Felix D. Gruber
*Assistant Examiner*—Steven A. Melnick
*Attorney, Agent, or Firm*—E. M. Whitacre; D. H. Irlbeck; L. L. Hallacher

[57] ABSTRACT

A method of detecting the forming of defective parts with a progressive die includes the step of generating a reference force/displacement curve for each forming station of the die while a number of sample parts are formed. The curves are stored in a data processor. The forming force at each forming station, and the displacement are monitored during the formation of production parts and supplied to the data processor. The production force data are compared to the reference force data for each displacement to indicate faults in various parameters previously set into the data processor.

11 Claims, 4 Drawing Sheets

METHOD OF DETECTING FAULTY PARTS IN A PROGRESSIVE DIE PRESS

BACKGROUND

This invention relates generally to the forming of thin metal parts and particularly to a method of detecting the forming of faulty parts in a press using progressive dies.

Many thin metal parts, such as the parts for the electron guns of color television picture tubes, are made using progressive dies. Such presses include a plurality of forming stations, with each station including a forming tool and a die. The forming tools and dies are configured and dimensioned so that a different operation is performed at each forming station. A strip of material is fed through the press to sequentially pass each of the forming stations. The number of forming stations is determined by the number of forming operations needed to form the part. Typically, all the forming tools are driven by a common ram so that every forming operation is performed for each stroke of the ram. The strip is inserted into the press in alignment with the first forming station and the first operation is performed. The strip is sequentially incremented past every forming station and when the beginning of the strip passes the last forming station the forming of the first part is completed. Accordingly, after the first complete part is formed, each stroke of the ram results in the formation of one complete part.

Changes in a wide variety of uncontrollable characteristics can cause the formation of defective parts. For example, changes in the thickness of the metal strip from which the parts are formed, flaws in the metal, wear on the forming tools and dies, and foreign matter on the metal strip can cause either the formation of defective parts, or damage to and breaking of the forming tools. There, therefore, is a need for a system and method for detecting the formation of faulty parts to either stop the forming press, or to permit the collection of data for analysis to correct the problem causing the defective formation. The present invention fullfills this need.

CROSS-REFERENCE TO RELATED APPLICATIONS

This invention can be used with the system described in U.S. application Ser. No. 638,551 entitled "In Press Workpiece Thickness Measuring System And Method" filed Aug. 7, 1984 by M. R. Martinez and W. J. Mitchell now U.S. Pat. No. 4,548,066.

This invention can also be used with the system described in U.S. application Ser. No. 638,557 entitled "System And Method For The In Press Adjustment Of Workpiece Holding Force" filed Aug. 7, 1984 by M. R. Martinez, Z. M. Andrevski and W. J. Mitchell now U.S. Pat. No. 4,592,220.

SUMMARY

A method of detecting the forming of faulty parts in a progressive die press having a plurality of forming stations each of which includes a forming tool and a force transducer. The press also includes means for measuring the displacement of the forming tools. The method includes the steps of producing a preselected number of sample parts while collecting reference force data from all of the force transducers, for a plurality of displacements. The reference force data and the displacement data are applied to a data processor which produces and stores a reference force/displacement curve for each of the forming stations. Production parts are formed while the force transducers for each of the stations are monitored to produce production force data. The production force data are provided to the data processor. The production force data are compared to the reference force/displacement curve for each of the displacements, and for each of the forming stations. A faulty part is indicated when the production force data, for at least one of the displacements, is different from the reference force data of the reference force/displacement curve by a preselected difference.

DETAILED DESCRIPTION

Figure 1:
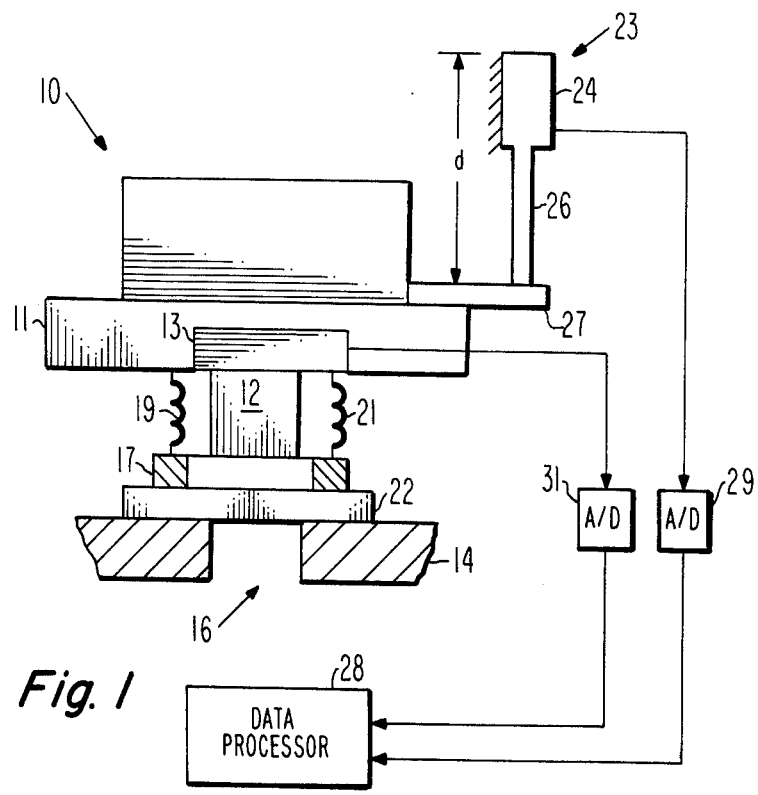
FIG. 1 is a simplified showing of a press for forming this metal parts, including the transducers utilized in the novel method.

In FIG. 1, a press 10 includes a vertically moveable ram 11, to which is affixed a forming tool 12. Arranged between the forming tool 12 and the ram 11 is a force transducer 13, which in the preferred embodiment is a quartz crystal, although other transducers, such as strain gages, can be used. A die 14, including an aperture 16, is positioned beneath the vertically moveable ram 11. A pressure pad 17 is coupled to the ram 11 by springs 19 and 21. A specimen 22 of material, from which a part is to be formed, is held against the die 14 by the pressure pad 17. The aperture 16 in the die 14 is dimensioned in accordance with the desired external dimension of the part to be pressed. The dimension of the forming tool 12 is selected in accordance with the desired internal dimension of the part to be formed, taking into consideration the thickness of the material specimen 22.

A displacement transducer 23, such as a linear variable differential transformer (LVDT), is permanently positioned a preselected distance d above the ram 11. The LVDT includes a transformer 24 and a core 26, which is fixed to the ram 11 by an appropriate coupling 27. Accordingly, as the ram 11 moves vertically with respect to the specimen 22, the core 26 moves along with the ram 11 and an output voltage indicative of the core 26 displacement is produced by the transformer 24. This displacement signal is applied to a data processor 28, preferably in the form of programmable computer, by an analog-to-digital converter (A/D) 29. As the forming tool 12 contacts the specimen 22 a force signal is produced by the force transducer 13. The force signal is an analog voltage which is proportional to the force the forming tool 12 exerts on the specimen 22. The force signal is applied to the data processor 28 by an A/D 31.

Figure 2:
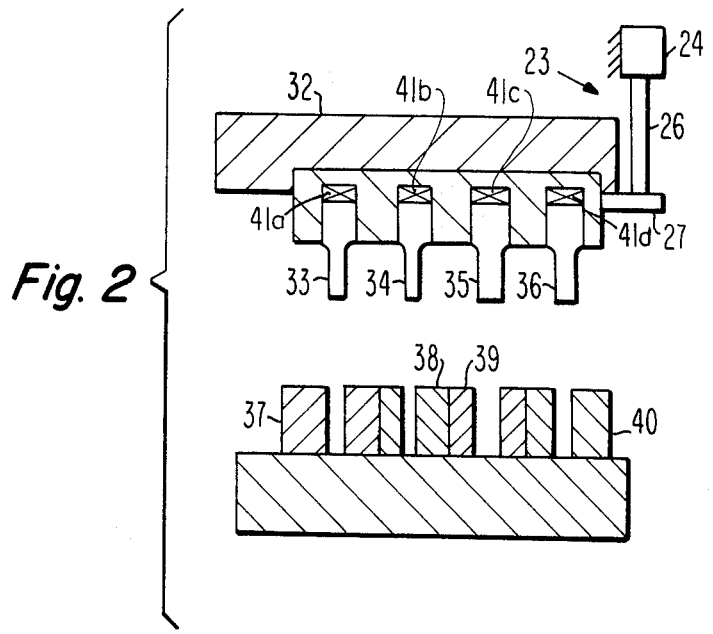
FIG. 2 is a simplified cross-sectional showing of several of the forming stations of a progressive die.

In FIG. 2, a ram 32, which serves the same function as the ram 11 in FIG. 1, supports a plurality of forming tools 33, 34, 35 and 36. Force transducers 41a, 41b, 41c and 41d are associated with each of the forming tools 33, 34, 35 and 36 respectively. A plurality of dies 37, 38, 39 and 40 is arranged in vertical alignment with the forming tools 33, 34, 35 nd 36 respectively. Each of the vertically aligned forming tool and die combinations serves as a forming station. The forming tools 33 to 36 and dies 37 to 40 are configured and dimensioned to perform a particular operation on a workpiece (not shown).

As explained hereinabove, a strip of material is incrementally and sequentially fed past the forming stations consisting of the forming tool and die combinations. After each incremental step, the workpiece is firmly held in place, such holding can be accomplished by the system described in U.S. Pat. No. 4,592,220. The thickness of the strip of material can also be measured in the manner described in U.S. Pat. No. 4,548,066. The ram 32 is actuated and all the forming tools 33 to 36 move vertically toward the dies 37 to 40 to form one complete part. In the simplified illustration of FIG. 2 four forming stations are shown. This is exemplary, the number of forming stations is determined by the number of operations required to form a complete part.

For each stroke of the ram 32 the force transducers 41a to 41d associated with the forming tools 33 to 36 supply force data to the data processor 28 (FIG. 1). Displacement data are simultaneously supplied by the displacement transducer 23 to the data processor 28. The force and displacement data are used to detect the formation of faulty parts in a manner fully described hereinafter.

Figure 3A:
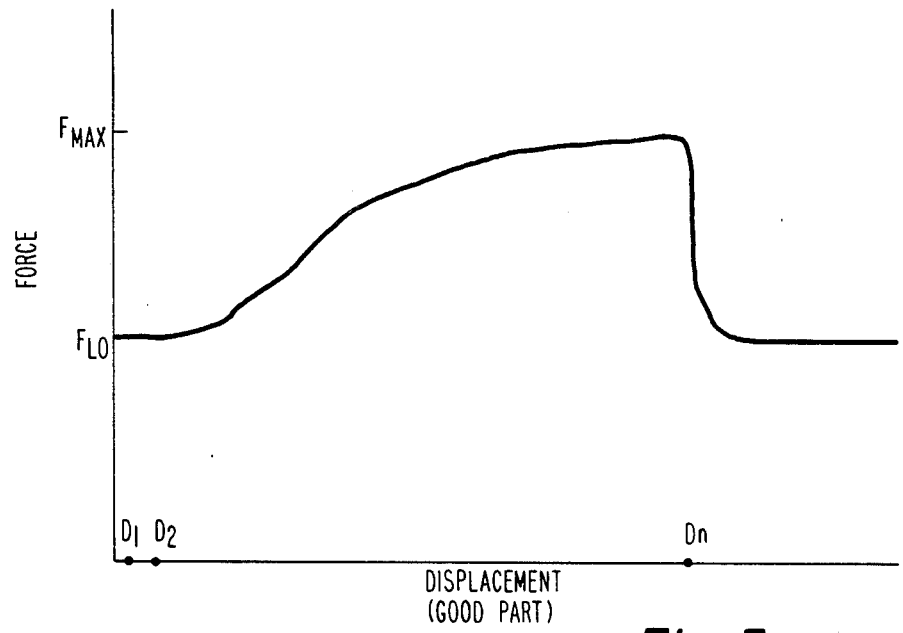
FIG. 3a shows the force/displacement curve when a good part is formed.

The invention is used to detect the formation of faulty parts by comparing production force/displacement data with reference force/displacement data stored in the data processor 28. Whenever the forming tools 33 to 36 and dies 37 to 40 are changed, the system must be recalibrated. The system is calibrated by forming a selected number of sample parts while recording reference force/displacement data for all of the forming stations. The displacement of the ram 11 causes the displacement transducer 23 to provide displacement data to the data processor 28. The output of the displacement transducer 23 is an analog voltage, the level of which is proportional to the displacement. The analog voltage is digitized in the A/D 29 and input to the processor 28. The ram 32 presses the forming tools 33 to 36 against the workpiece, and the force transducers 41 associated with the forming tools produce analog voltages proportional to the forming forces. The force signals are digitized in the A/D 31 and provided to the processor 28. After all the sample parts are formed, the displacement data and the force data are utilized to "plot" reference force/displacement curves of the type shown in FIG. 3a. In FIG. 3a, force data for one of the forming stations, e.g. the station including forming tool 33 and die 37, which were recorded at a displacement $D_1$ during the formation of all the sample parts are averaged and one point on the reference force/displacement curve is available. The force data recorded at a displacement $D_2$ of the ram 32 are averaged to establish the second point on the reference force/displacement curve of FIG. 3a. The force data averaging is continued until the displacement $D_n$ at which the maximum force $F_{max}$ occurs is reached. The reference force/displacement curves are stored in the data processor 28 and production force data collected during the formation of production parts are compared with the stored data. A reference force/displacement curve is stored in the data processor 28 for every one of the forming stations. Accordingly, when four forming stations are utilized, as shown in FIG. 2, the data processor 28 stores four reference displacement curves.

The number of ram displacements for which force data are recorded is determined by the clocking rate of the data processor 28. The displacement and force signals are analog voltages available over a time period determined by the stroke of the ram 12. Both signals are continuously available to the data processor 28 in digital form. The data are admitted to the processor upon the occurrence of each clock pulse to the processor 28. Accordingly, the reference force/displacement curves of the type shown in FIG. 3a in effect, are slices of the analog force signals spaced at the clock rate of the processor 28. The abscissas of the curves in FIGS. 3a to 3d, therefore, can be labeled either time or displacement. The primary limiting factor on the number of displacements for which force data are plotted is the memory capacity of the data processor 28. During the formation of production parts, the force transducers 41 for all the forming stations are monitored and the production force data for each of the displacements $D_1$ to $D_n$ are compared with the reference force/data for the corresponding displacements of the reference force/displacement curve for that station. Differences, beyond allowable limits, in the production data and the reference data are indicative of various types of flaws. The production data can be printed out and used to analyze the production method. Alternatively, the detection of a faulty part can be used to immediately stop the press to avoid the possibility of damaging any of the forming tools or dies.

Figure 4:
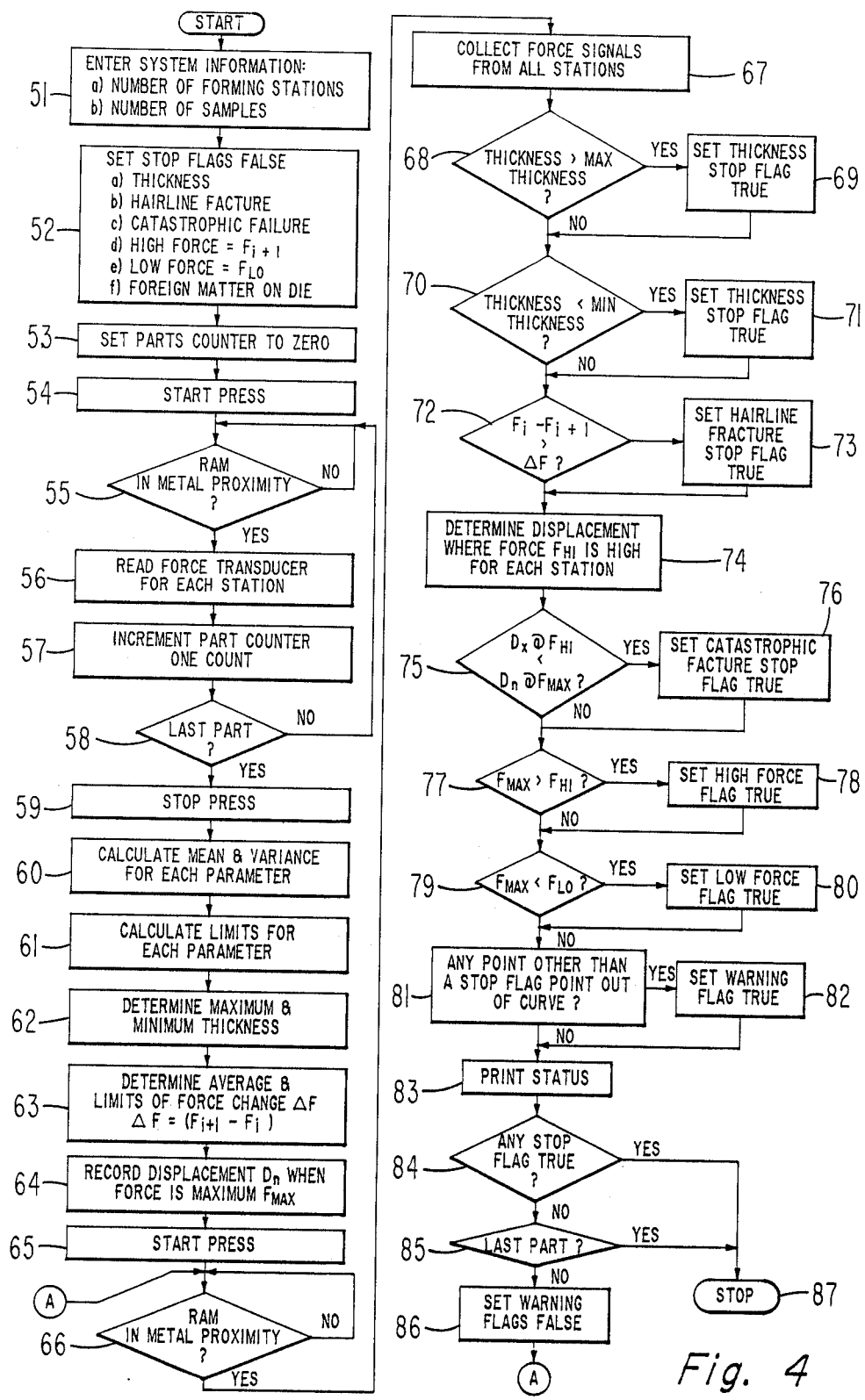
FIG. 4 is a flow chart of a preferred method.

FIG. 4 is a flow chart of a method for performing the above-described comparisons. In FIG. 4, the generation of the reference force/displacement curves begin with step 51 by setting the number of forming stations, and the number of sample parts to be formed, into the data processor 28. In step 52, all the stop flags for the various parameters to be monitored are set false. The number and types of parameters to be monitored are dependent upon the part to be formed and typically will vary from part to part. In the preferred embodiment, the thickness of the material is monitored. Additionally, various failures, such as hairline fractures, catastrophic failures and foreign matter on the die are used to indicate the forming of a faulty part. The highest force $F_{HI}$ and lowest force $F_{LO}$ which will form an acceptable part are also parameters monitored to detect a faulty part. The values of the forces $F_{HI}$ and $F_{LO}$ are determined by the type and thickness of the metal being formed, the operation being performed, the dimensions of the part, etc. The calculation of the forces $F_{HI}$ and $F_{LO}$ is within the purview of one skilled in the metal forming art. In step 53, a sample parts counter is set to zero. In step 54, the press is started to allow a heavy flywheel, which causes the ram to move downwardly at high force, to gain speed. Step 55 is used to indicate when the forming tool reaches the proximity of the metal. This avoids inputting a large amount of meaningless data to the data processor. Several alternatives are available. The displacement transducer 23 can be monitored and data input to the processor starting at a particular displacement. The force transducers 41 can be monitored and data input started when the force signal rises above a noise level when the forming tools contact the metal. In step 56, the force transducers 41 for all the forming stations of the press and the displacement transducer 23 are read. The force and displacement data are clocked into the data processor 28 and the data for one force/displacement curve for every forming station is available for subsequent averaging to develop the reference curves. In step 57, the part counter is incremented one count. At decision step 58, when another sample part is to be produced, step 55 is reentered. In decision 58 when the last sample part has been formed the press is stopped at step 59.

After the press is stopped, step 60 is entered to calculate the means and variances of the force/displacement curves for each of the forming stations. The mean value $\mu$ and the variance $\sigma_2$ for each parameter are calculated using the well known equations:

$$\mu^2 = \frac{\sum\limits_{1}^{n} x_i}{n} \qquad (1)$$

and $$\sigma^2 = \frac{\sum\limits_{1}^{n} (x_i - \mu)^2}{n-1} \qquad (2)$$

where:
$\sigma_n^2$ = force reading variance
x = The individual force readings
$\mu$ = mean force reading
n = number of force readings.

Step 61 is entered and the force limits for every point are determined. A large number of force signals are collected during the generation of the reference data for each displacement $D_1$ through $D_n$ on the force/displacement curve. Acceptable parts were formed during the collection of the reference data and, therefore, the force data collected during the formation of these parts typically is valid data. Accordingly, typically, the limits for each forming station are selected such that a very high percentage, such as 99%, of the force signals gathered during the generation of the reference curves lie between the selected high and low limits. The limit selection can be accomplished by plotting standard bell shaped curves and selecting all data lying within the desired percentages. In step 62, the maximum and minimum thickness allowable for the strip of material from which the parts are to be formed are calculated in accordance with the mean and variance determined using the techniques of equations (1) and (2) above. The maximum and minimum permissible thicknesses therefore are set into the data processor 23 at this step.

In step 63, the average and limits of a force change $\Delta F$ are determined. The force change $\Delta F$ is determined by noting the force at a particular displacement d of the ram 32, and substracting from it the force recorded at the immediately preceding displacement. As the forming tool contacts the metal strip the force gradually increases while the tool forms the part. Accordingly, as shown in FIG. 3a, the signal from the force transducer increases as the displacement signal increases. The averages of the force changes $\Delta F$, which occured during the formation of the sample parts, are determined and $\Delta F$ limits are calculated, using equations (1) and (2) above, and bell curves, so that a large percentage, such as 99%, of the actual force changes fall between the limits. In step 64, the displacement $D_n$ (FIG. 3a) at which the force $F_{max}$ occurs is recorded.

The calibration and preliminary steps of the novel method are now complete and step 65 is entered to start the press for the formation of production parts. Accordingly, the metal strip is inserted into the press and the production of parts commences. Step 66 is used to indicate when the forming tools are in the proximity of the metal. In step 67, the force data from all the force transducers 41 are input to the data processor 28 simultaneously with the displacement signal from the displacement transducer 23. The production force and displacement data are clocked into the data processor 28 in the same manner as the reference data, as explained hereinabove. At decision 68, the thickness of the strip of material is measured, preferably in the manner described in U.S. Pat. No. 4,548,066 to determine whether or not the thickness exceeds the maximum permissible. When the thickness does exceed the maximum permissible, step 69 is entered to set the thickness stop flag to true. An operational option is now available. When the data being gathered are to be used primarily for evaluation, or study purposes, after the maximum thickness stop flag is set true, step 70 can be entered to continue gathering data. Alternatively, when production parts are being run, the primary purposes of the data are the avoidance of damage to the forming tools, and the detection of faulty part formation, the press can be immediately stopped. The same alternatives are available for the other comparisons of the method which are described hereinafter. In comparison step 68, when the thickness does not exceed the maximum thickness, comparison step 70 is entered to determine whether or not the thickness is less than the minimum permissible thickness. When the material thickness is below the minimum, step 71 is entered to set the minimum thickness stop flag true.

In comparison step 72 the force $f_{i+1}$ at a particular displacement is compared with the force $f_i$ at the immediately preceding displacment to determine whether the force change $\Delta F$ either exceeds the permissible maximum or is negative. When $\Delta F$ is negative or exceeds the maximum, step 73 is entered to set the hairline fracture stop flag true. When the force change $\Delta F$ is within limits, step 74 is entered to determine the displacement at which the forming force is highest $F_{HI}$. In step 75, the displacement $D_n$ at which the force $F_{max}$ occurred on the reference force data curve of FIG. 3a is compared with the displacement $D_x$ (FIG. 3c) at which the highest force $F_{HI}$ occurred. When the displacement $D_x$ is substantially less than the displacement $D_n$, a faulty part has been formed and step 74 is entered to set the catastrophic failure stop flag true. When a good part has been formed comparison step 77 is entered and the highest force $F_{HI}$ is compared with the reference high force $F_{max}$. When the reference maximum force $F_{max}$ exceeds the measured highest force $F_{HI}$ the forming force was not high enough to form an acceptable part and step 78 is entered to set the high flag force true. In comparison step 79, the highest force $F_{HI}$ is compared with the lowest force $F_{LO}$ of the reference curve. When the highest force $F_{HI}$ is less than the lowest force $F_{LO}$ step 80 is entered to set the low force flag true. This condition can indicate that the forming tool force was not sufficient to form an acceptable part. Alternatively, a low forming force can indicate that a broken part was formed during the preceding stroke of the ram. At comparison step 81, all points of the production force/displacement curve are compared with the corresponding points of the reference force/displacement curve to determine whether a problem exists with a parameter other than the parameters programmed into the data processor 28. When such a failure has occurred a warning flag is true at step 82.

Step 83 is entered to print the status of the part which has just been formed. This printout can be used for inventory purposes or for analysis of the method. At step 84, when any stop flag has been set true stop step 87 is entered. At step 84, if no stop flags are true, step 85 is entered to determine whether or not the last part has been formed. This step can be used if a predetermined number of parts to be formed is set into the data processor 28. Alternatively, if a sufficient number of parts has been produced but not automatically counted, the system can be stopped simply by using a stop switch. Step 86 is entered to set all the warning flags false and the production of parts is commenced by reentry to step 66 in FIG. 4.

Figure 3B:
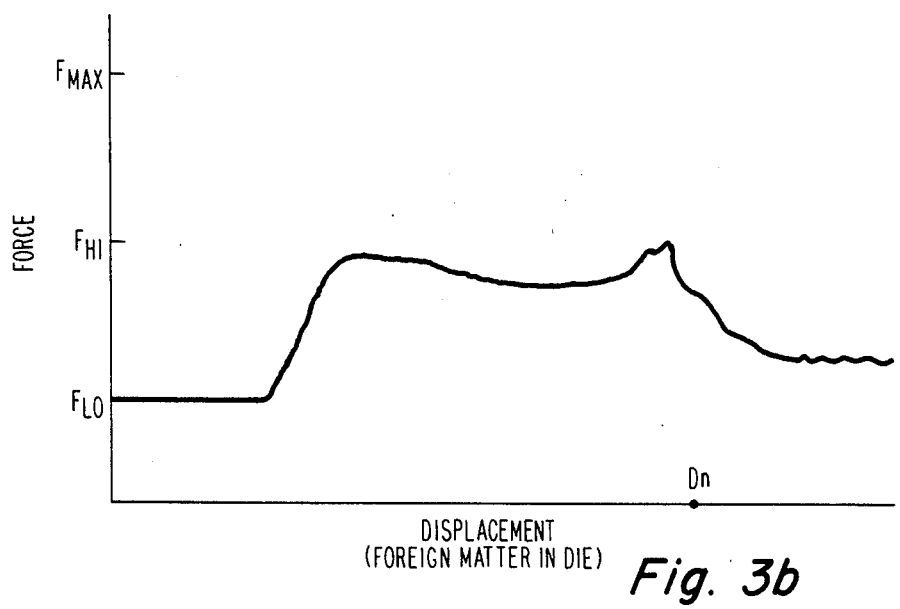
FIG. 3b shows the force/displacement curve when foreign matter is on the die.

In FIG. 3b, which is the force/displacement curve produced when foreign matter is on the die or part material, the highest force $F_{HI}$ is substantially lower than the maximum force $F_{max}$ of the reference force/displacement curve indicating that the foreign matter has absorbed a substantial amount of the pressing energy and an acceptable part has not been formed.

Figure 3C:
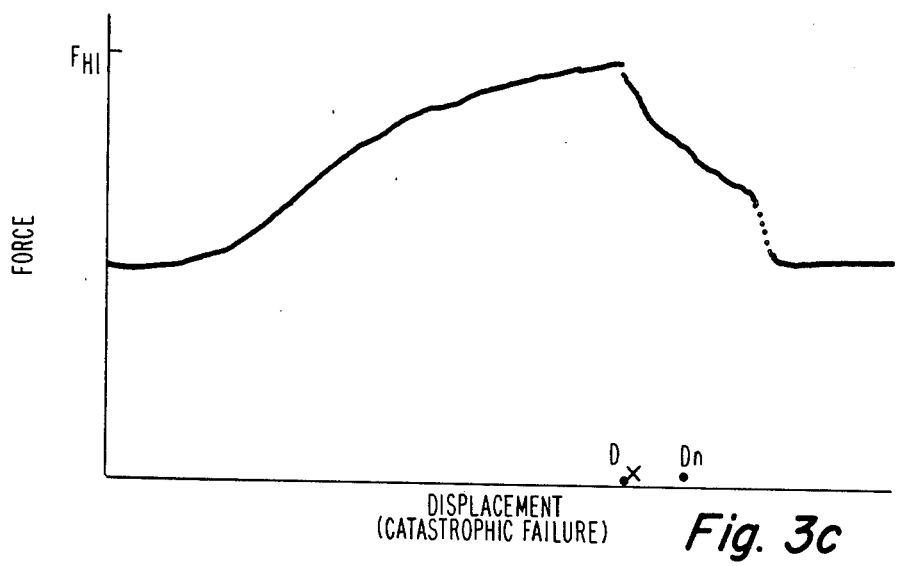
FIG. 3c shows the force/displacement curve when a catastrophic failure has occurred.
Figure 3D:
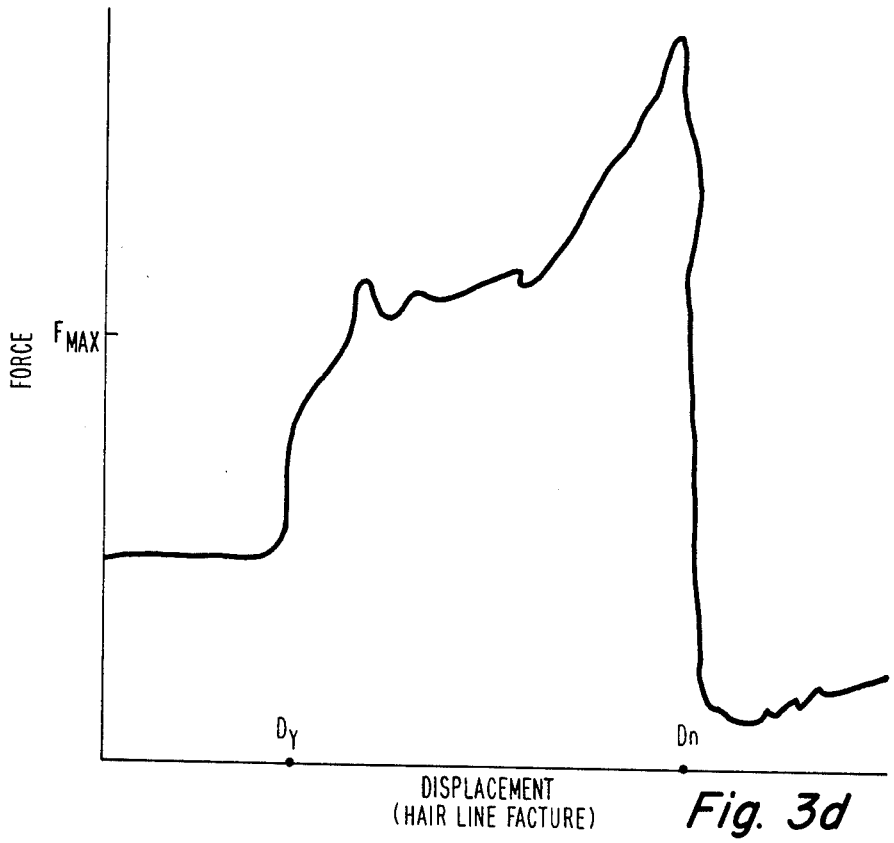
FIG. 3d shows the force/displacement curve when a part containing a hairline crack has been formed.

In FIG. 3c, the highest force $F_{HI}$ occurs at a displacement different from the displacement $D_n$ of the reference curve, indicating that a broken part has been formed.

In FIG. 3b, the slope of the curve at a displacement $D_y$ is very steep. This condition would be detected by an excess $\Delta F$ and step 70 of FIG. 4 and indicate that a hairline fracture has occurred.

What is claimed is:

1. A method of detecting the forming of faulty parts in a progressive die press having a plurality of forming stations, a forming tool and a force transducer at each of said stations, and means for measuring the displacement of said forming tools comprising the steps of:
   producing a preselected number of sample parts while collecting reference force data from all of said force transducers for a plurality of displacements of said forming tools;
   providing said reference force data and said displacements to a data processor and, producing and storing a reference force/displacement curve for each of said forming stations;
   forming production parts while monitoring said force transducers for each of said stations and providing production force data, for each of said forming stations, to said data processor;
   comparing said production force data to said reference force/displacement curve for each of said displacements, and for each of said forming stations; and
   indicating a faulty part when said production force data, for at least one of said displacements, is different from said reference force data of said reference force/displacement curve by a preselected difference;
   setting a plurality of stop flags into said data processor, each of said stop flags defining a parameter to be compared in detecting a faulty part, said parameters including a maximum forming force and a minimum forming force; and
   comparing the displacement at which the highest forming force occurs during the formation of a production part with the displacement at which said maximum force occurs on said reference force/displacement curve to identify the type of fault which caused said faulty part.

2. The method of claim 1 further including the steps of comparing the displacement at which the lowest forming force occurs during the formation of a production part with the displacement at which said minimum forming force occurs on said reference force/displacement curve to identify the type of fault which caused said faulty part.

3. The method of claim 2 wherein the points for said reference force/displacement curve are obtained by averaging said reference force data, for each of said displacements, obtained while forming all of said sample parts.

4. The method of claim 3 further including the step of calculating a forming force change by detecting the forming force at each of said displacements and subtracting the forming force at the immediately preceding displacement.

5. The method of claim 4 further including the steps of continuously applying said force data and said displacements to said data processor as digital signals, and clocking said force data and said displacements into said data processor at the clock rate of said data processor.

6. The method of claim 1 wherein the points for said reference force/displacement curve are obtained by averaging said reference force data, for each of said displacements, obtained while forming all of said sample parts.

7. The method of claim 6 further including the steps of continuously applying said force data and said displacements to said data processor as digital signals, and clocking said force data and said displacements into said data processor at the clock rate of said data processor.

8. The method of claim 7 further including the step of calculating a forming force change by detecting the forming force at each of said displacements and subtracting the forming force at the immediately preceding displacement.

9. The method of claim 1 further including the step of calculating a forming force change by detecting the forming force at each of said displacements and subtracting the forming force at the immediately preceding displacement.

10. The method of claim 9 further including the steps of comparing the displacement at which the lowest forming force occurs during the formation of a production part with the displacement at which said minimum forming force occurs on said reference force/displacement curve to identify the type of fault which caused said faulty part.

11. The method of claim 10 wherein the points for said reference force/displacement curve are obtained by averaging said reference force data, for each of said displacements, obtained while forming all of said sample parts.

* * * * *